March 18, 1924.  1,487,401
T. RESTEL
CYLINDER HONE OR LAPPING TOOL
Filed May 12, 1923
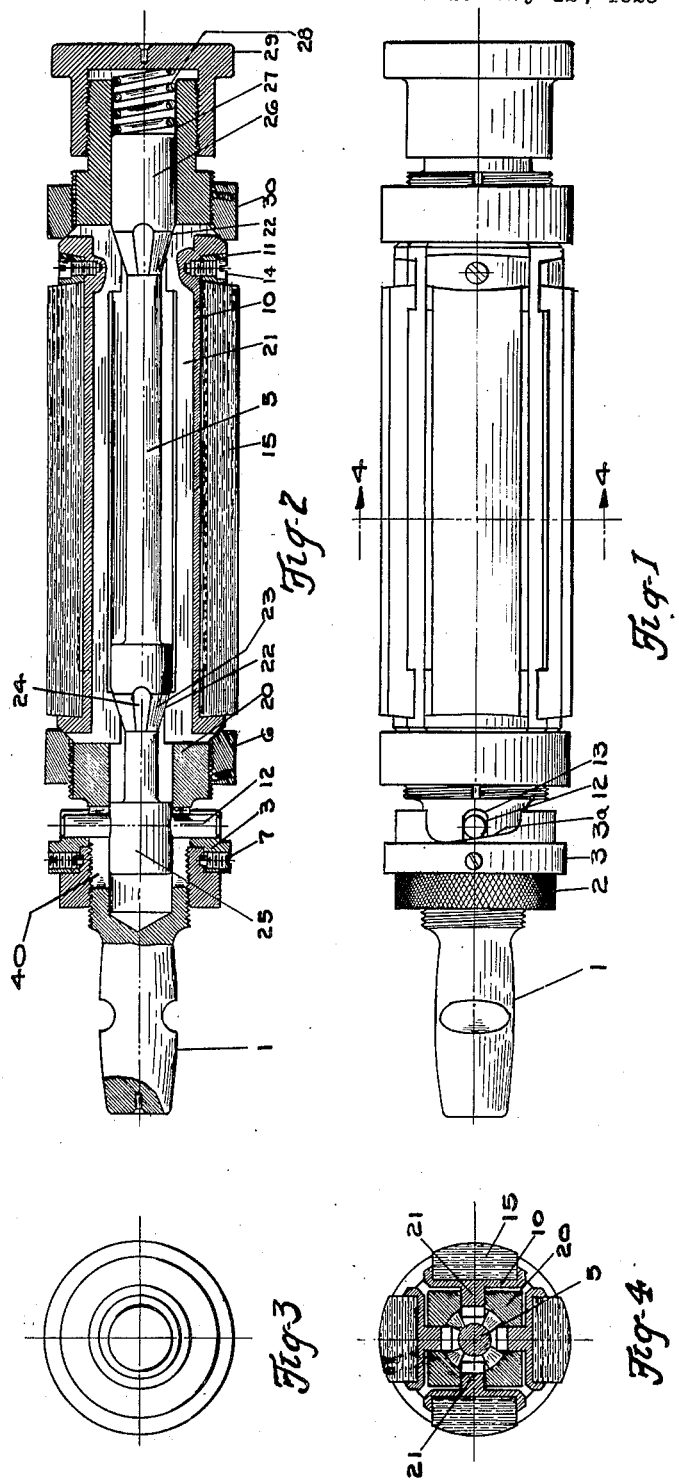
INVENTOR
Theodore Restel
BY John A. Bommhardt
ATTORNEY Patented Mar. 18, 1924.

1,487,401

UNITED STATES PATENT OFFICE.

THEODORE RESTEL, OF CLEVELAND, OHIO.

CYLINDER HONE OR LAPPING TOOL.

Application filed May 12, 1923. Serial No. 638,517.

*To all whom it may concern:*

Be it known that I, THEODORE RESTEL, a citizen of the United States, residing at Cleveland, in the county of Cuyahoga and State of Ohio, have invented certain new and useful Improvements in Cylinder Hones or Lapping Tools, of which the following is a specification.

This invention relates to cylinder hones or laps for the purpose of finishing and polishing the interior of engine cylinders or the like, and has for its object to provide an improved tool for the purpose stated, characterized by improvement with respect to the means for holding and adjusting the honing stones or blocks which contact with the surface of the cylinder.

Ordinarily, these tools are provided with holders for the stones which are movable radially to expand or contract the tool, the same being contracted so that it may be entered into the cylinder and then released to permit the springs to press the stones against the surface being polished. In the present device, the radial movement is accomplished by means of a conical spreader or mandrel, by a spring the tension of which can be adjusted.

The invention is illustrated in the accompanying drawing in which Fig. 1 is a plan of the tool. Fig. 2 is a longitudinal section. Fig. 3 an end view. Fig. 4 is a section on the line 4—4 of Fig. 1.

Referring specifically to the drawings, 1 indicates a stem to which any suitable driving shaft, usually a flexible shaft, may be attached, for the purpose of rotating the tool. This is threaded to receive a nut 2 which can be screwed toward radial pins 12 in the notches 13 in the end of the body 20, the nut carrying a cam ring 3 with cam recesses 3ª receiving the ends of the pins 12, the nut and cam ring being connected together in any desired position by set screws 7.

The body 20 is threaded to receive a retaining ring nut 6 which is adapted to engage across the ends of the holders or shoes 10 for the stones 15 which are set in the recesses in the shoes. The back of each holder has a rib 21 which fits for radial movement in a longitudinal slot in the body 20, and each rib has at each end an inclined face 22 which cooperates with the face of a conical head or boss 23 on a spindle or mandrel 5 which fits in an axial bore in the body 20, preferably having flattened surfaces 24 to receive the inclined edges of the ribs 21. The spindle 5 has at one end a head 25 which fits in a bore in shank 1, and the pins 12 project from this head, and accordingly when the stem 1 is driven the engagement of the pins 12 in the recesses 3ª and the notches 13 causes the body, and the stones carried thereby, to rotate with the stem. The front ends of blocks 15 are held by wedges 11 secured in place by screws 14, and the holders are held at this end by a ring nut 30 which screws on the stock. The front end of the spindle 5 has a head 26 which fits in a bore 27 in the stock and is pressed by a coiled spring 28 confined by a cap 29 screwed on the stock. This cap can be adjusted to give any desired tension on the spring.

The spindle 5 is shiftable in the tool to expand the holders and the segmental stones carried thereby. Normally, the pressure of the spring 28 causes the conical surfaces 22 to force the shoes outwardly as far as permitted by the nuts 6 and 30. To contract the shoes, or to permit them to be contracted, the cam ring 3 is turned, causing the pins 12 to ride up the cams 3ª and thereby forcing the pins 12 outwardly in the slots 13 and shifting the spindle 5 against the tension of the spring 28 thereby releasing the wedge pressure of the conical heads and permitting the holders to be contracted so that they can be entered into the cylinder to be honed or lapped. Then the cam ring 3 is turned the other way and the spring 28 will act to shift the conical members and spindle and expand the shoes until the stones contact with the surface of the cylinder. Then the power may be applied to rotate the tool and hone and polish the inside of the cylinder. It will be noted that the stem or shank 1 is integral with the body 20 and the pins 12 work in slots 40 in the neck joining the stem to the body. By means of the conical heads actuated by the single spring 28 the pressure is communicated evenly to all the shoes, and as stated, this pressure is adjustable by means of the cap 29. In case the surfaces of the stones 15 carried by the shoes 10, become worn, proper adjustment to take up the wear on said stones is made by turning the knurled nut 2.

I claim:

1. A cylinder lapping tool comprising a stock having slots, radially movable stone holders extending into said slots, an axially movable spindle in the body and provided with conical heads bearing against said holders, a spring pressing against the end of the spindle and tending to advance the same to expand the holders, and means to push back the spindle against the tension of the spring to permit contraction of the holders, said means including a cam mounted on the stock and having an operative connection to the spindle.

2. A cylinder lapping tool comprising a stock having slots, radially movable stone holders extending into said slots, an axially movable spindle in the body and provided with conical heads bearing against said holders, a spring pressing against the end of the spindle and tending to advance the same to expand the holders, and means to push back the spindle against the tension of the spring to permit contraction of the holders, the spindle having a projecting pin, and said means including a cam ring mounted on the stock and bearing against the pin.

3. A cylinder lapping tool comprising a stock slotted lengthwise, a plurality of stone holders assembled around the stock and having ribs guided in the slots, an axial spindle in the stock having conical surfaces bearing against the ribs to expand the holders, a spring pressing against one end of the spindle and tending to advance the same in the direction to expand the holders, and a cam device operatively connected to the opposite end of the spindle and mounted on the stock and adapted to push back the spindle against the tension of the spring.

In testimony whereof, I affix my signature in presence of two witnesses.

THEODORE RESTEL.

Witnesses:
JOHN A. BOMMHARDT,
EDWARD J. HOBDAY.